(12) United States Patent
Yasui et al.

(10) Patent No.: US 7,586,830 B2
(45) Date of Patent: Sep. 8, 2009

(54) MAGNETIC RECORDING MEDIUM AND MANUFACTURING METHOD THEREFOR

(75) Inventors: Nobuhiro Yasui, Kawasaki (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 11/378,347

(22) Filed: Mar. 20, 2006

(65) Prior Publication Data
US 2006/0222905 A1  Oct. 5, 2006

(30) Foreign Application Priority Data
Apr. 5, 2005  (JP) .............................. 2005-108666

(51) Int. Cl.
*G11B 7/00* (2006.01)
(52) U.S. Cl. .................. 369/275.1; 369/283; 369/44.14
(58) Field of Classification Search ........................ None
See application file for complete search history.

(56) References Cited

U.S. PATENT DOCUMENTS 6,055,139 A    4/2000  Ohtsuka et al. ............. 360/131
2005/0233176 A1*  10/2005  Takai et al. .................. 428/836
2006/0022342 A1    2/2006  Fukutani et al. ............. 257/758
2006/0222903 A1   10/2006  Ichihara et al. ............. 428/827
2007/0054421 A1    3/2007  Ueda et al. ..................... 438/3

FOREIGN PATENT DOCUMENTS

JP    2003-030827    1/2003

* cited by examiner

*Primary Examiner*—Muhammad N. Edun
(74) *Attorney, Agent, or Firm*—Fitzpatrick, Cella, Harper & Scinto

(57) ABSTRACT

There is provided a novel magnetic recording medium which less damages the recording layer and of which recording tracks are fully magnetically spaced apart and manufacturing method therefor. The present invention provides the magnetic recording medium having a recording layer on a member with concave and convex portions, wherein the recording layer is provided on the concave and convex portions, and the recording layers on the concave and convex portions are different in magnetic properties with each other.

14 Claims, 5 Drawing Sheets

MAGNETIC RECORDING MEDIUM AND MANUFACTURING METHOD THEREFOR

BACKGROUND OF THE INVENTION

1. Field of the Invention

The present invention relates to a magnetic recording medium used for a magnetic recording reproduction device such as magnetic disk system and the like, capable of high density recording, and manufacturing method therefor.

2. Related Background Art

Magnetic recording media have advanced in recording density in recent years. A magnetic recording method is being transferred from an in-plane recording method to a vertical recording method. The in-plane recording method is such that magnetic field is applied along a magnetic recording surface. The method however has a limitation on the increase of recording density in that increase in recording density decreases one-bit magnetic domain, canceling out between peripheral magnetic domains, which losing magnetic force. The vertical recording method is such that a magnetic field is applied perpendicular with respect to a recording surface, so that a magnetic domain can be widened, less influenced by demagnetizing field, thereby recording density can be increased. Nevertheless, further high density recording has been demanded even in the vertical magnetic recording method. In a conventional recording medium of which layer is uniform, magnetic flux from a recording head spreads to targeted recording tracks as well as their adjacent tracks, which can disturb recording state of the adjacent tracks. This disturbance causes a lateral crosstalk noise at the time of reproduction of recording.

For this reason, a large number of improvements have been proposed until now. U.S. Pat. No. 6,055,139 puts forth a proposal that magnetic characteristics are changed by varying film thickness. Another proposal is that recording layers are directly patterned because it is preferable to magnetically separate recording tracks. Japanese Patent Application Laid-Open No. 2003-30827 states that resist and dry etching process are not required, instead of which recording layers are subjected to light beams, electron beams, or ion beams to locally heat the layers, thereby magnetization is decreased by diffusion of materials from a diffusion species layer underlying the recording layer to a recording layer, which enables magnetically separating recording tracks.

In steps for magnetically separating recording tracks in the aforementioned recording layer, direct dry etching is performed by, needless to say, using light beams and the like as an assist source to promote mutual diffusion through other materials after the formation of the recording layer. Methods of decreasing magnetization may damage regions to be used as recording tracks. For that reason, there has been demanded a method of allowing magnetic separation in the forming process of a recording layer.

The purpose of the present invention is to provide a novel magnetic recording medium which less damages the recording layer and of which recording tracks are fully magnetically spaced apart and manufacturing method therefor.

SUMMARY OF THE INVENTION

The magnetic recording medium according to the present invention is characterized in that in the magnetic recording medium having a recording layer on a member with concave and convex portions the recording layer having cylindrical magnetic particles is provided on the concave and convex portions, and the recording layers on the concave and convex portions are different in magnetic properties with each other.

According to the first aspect of the present invention, there is provided a magnetic recording medium having a recording layer on a member with a concavo-convex portion, wherein the recording layer has cylindrical magnetic particles, the recording layer is provided on the concave and convex portions, and the recording layers on the concave and convex portions are different in magnetic properties from each other.

The magnetic properties of the recording layer on the convex and concave portions, the recording layer on the convex portion is preferably higher in remanence and coercivity than the recording layer on the concave portion.

In the magnetic recording medium according to the first aspect, a granular structure is preferably formed on the recording layer at least on the convex portion.

The magnetic recording medium satisfies at least one of the following:

the cylindrical magnetic particle in the granular structure in the recording layer on the concave portion is smaller in average diameter than the cylindrical magnetic particle in the granular structure in the recording layer on the convex portion, and the cylindrical magnetic particle in the recording layer on the convex portion is parallel with the direction vertical to a substrate, while at least a part of the cylindrical magnetic particles in the recording layer on the concave portion deviates from parallel.

The recording layer on the concave portion is preferably comprised of an amorphous structure in which the existence of particles are substantially not recognized.

The recording layer on the member is substantially flat, preferably.

The concave portion is preferably 50 nm or less in depth D and 100 nm or less in width Wg at the surface of a material of the concave portion. The width Wg is preferably less than the double of the depth D.

The convex portion is preferably 10 nm or more to 300 nm or less in width Wt. The recording layer on the convex portion is preferably 30 nm or less in thickness.

According to the second aspect of the present invention, there is provided a method of manufacturing the magnetic recording medium according to the first aspect comprising the steps of:

introducing the member with the concave and convex portions into a sputtering device, subjecting the member as a substrate to the application of a DC or RF(radio frequency) bias voltage, whereby a magnetic material is sputtered to form a granular structure with cylindrical magnetic particles at least on the convex portion.

According to the third aspect of the present invention, there is provided a method of manufacturing the magnetic recording medium according to the first aspect comprising the steps of:

introducing the member with the concave and convex portions into a sputtering device, subjecting the member as a substrate to the application of a DC or RF bias voltage, whereby AlSi is sputtered to form a granular structure with cylindrical Al particles at least on the convex portion, and then removing Al portions to fill a magnetic material.

According to the fourth aspect of the present invention, there is provided a magnetic recording reproduction device using the magnetic recording medium according to the first aspect.

According to the fifth aspect of the present invention, there is provided an information processing device using the magnetic recording reproduction device according to the fourth aspect.

Formation of the recording layers different in magnetic properties on the member with concave and convex according to the present invention realizes a recording layer which less damages the recording layer and of which recording tracks are fully magnetically spaced apart and suited for high density recording.

DETAILED DESCRIPTION OF THE PREFERRED EMBODIMENT

The magnetic recording medium according to the present invention is described in detail with reference to the drawings.

(Structure)

Figure 1:
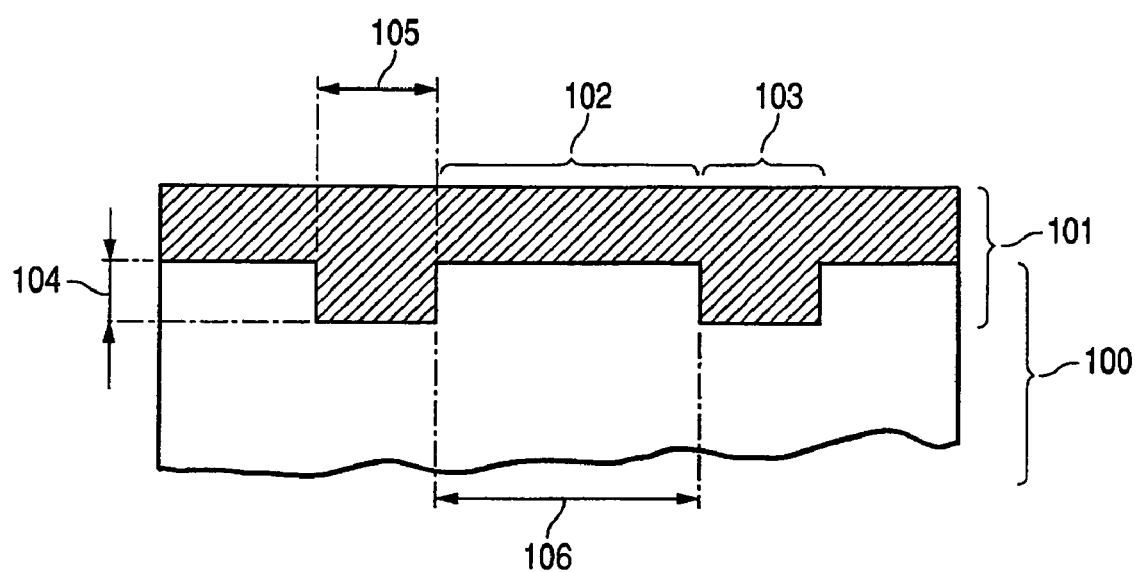
FIG. 1 shows a schematic diagram of a structure according to the present invention.

FIG. 1 shows a schematic diagram of a structure according to the present invention.

In the figure, the structure is characterized by having a recording layer 101 on a member 100 with concave and convex portions thereon. The dimensions of the concave portion of the member 100 with the concave and convex portions thereon can be shown by the depth (D) 104 of the concave portion and the width (Wg) 105 of the concave portion. The width (Wt) 106 of the convex portion corresponds to the width of a recording track. The ranges of a recording layer 102 on the convex portion and of a recording layer 103 on the concave portion show regions corresponding to the member 100 with the concave and convex portions thereon. The present invention is characterized in that the portions 102 and 103 of the recording layers on the convex and concave portions respectively are different in magnetic properties from each other. Furthermore, it is preferable that the portion 103 of the recording layer on the concave portion is smaller than the portion 102 of the recording layer on the convex portion in remanence and coercivity. Still furthermore, it is preferable that the portion 103 of the recording layer on the concave portion is 0.2 or lower in a ratio of remanence to saturated magnetization and is 1 kOe or less in coercivity. It is also preferable that the portion 102 of the recording layer on the convex portion is 0.5 or higher in a ratio of remanence to saturated magnetization and is 2 kOe or more in coercivity.

Figure 3A:
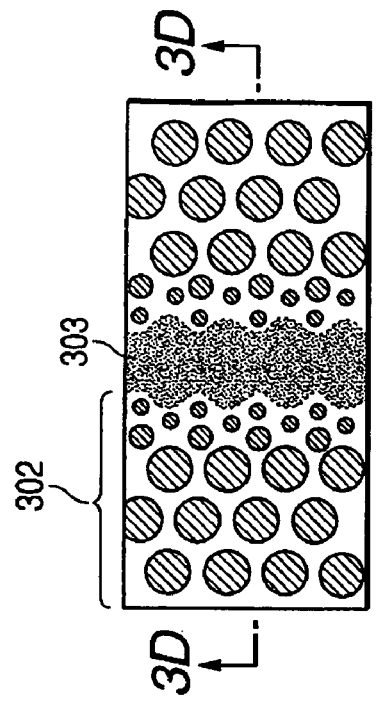
FIGS. 3A, 3B, 3C and 3D show schematic diagrams of structures of recording layers according to the present invention.
Figure 3B:
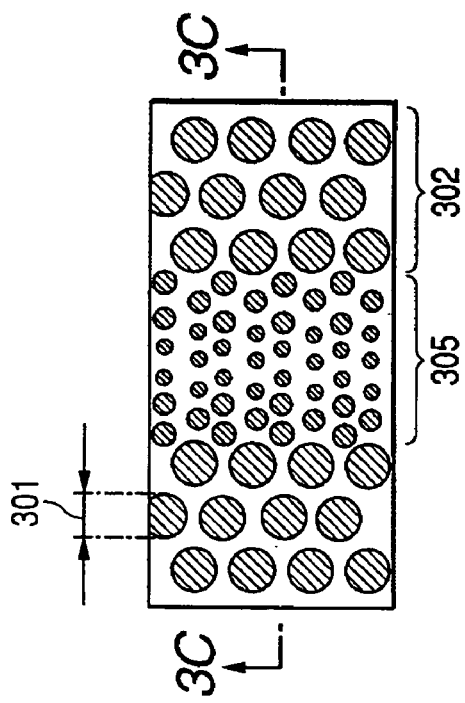
Figure 3C:
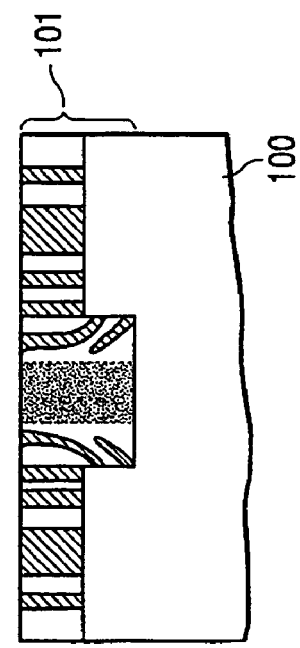
Figure 3D:
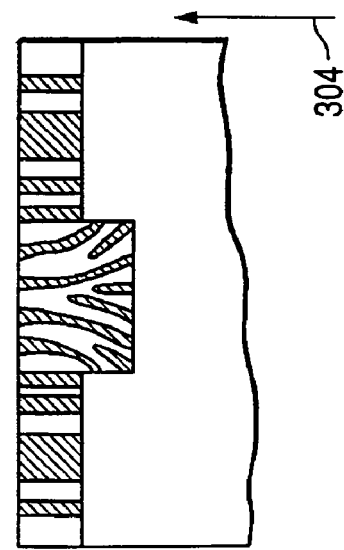

FIGS. 3A to 3D show schematic diagrams of structures of the recording layers according to the present invention. FIGS. 3A and 3C are a plan and a section view showing an example of a recording layer with a granular structure, provided on the concave portion. FIGS. 3B and 3D are a plan and a section view showing an amorphous structure in the recording layer on the concave portion.

It is difficult to measure the abovementioned properties in a state shown in FIG. 1. For this reason, as shown in FIGS. 3A to 3D, a uniform film being the same in structure as a granular structure 302 forming the portion 102 of the recording layer on the convex portion has been prepared to measure remanence and coercivity. Further, a uniform film being the same in structure as a granular structure 305 or an amorphous structure 303 forming the portion 103 of the recording layer on the concave portion has been prepared to measure remanence and coercivity. It is desirable that the recording layer on the convex portion is 1.2 times or more as high as the recording layer on the concave portion in coercivity and remanence, preferably 2 times or more, more preferably 5 times or more. It is desirable that magnetic patterns on both portions are recorded, thereby clear recorded patterns at the portion 102 of the recording layer on the convex portion can be observed with a magnetic force microscope and unclear recorded patterns or a state in which no recorded pattern is observed can be observed to evaluate. In this case, quantitativity is not ensured, but it is important to distinguish both regions from the standpoint of magnetic recording.

Depending on conditions of forming a recording layer, the granular structure 305 at the portion 103 of the recording layer on the concave portion can be smaller in a magnetic particle size 301 than that at the portion 102 of the recording layer on the convex portion. Moreover, it is possible that the recording layer on the concave portion can form not granular structure 305, but uniform amorphous structure 303 instead. In the former, it is preferable that its size is proper enough to produce a marked super paramagnetism, and in particular, the mean value of the magnetic particle size 301 is preferably 4 nm or less. Super paramagnetism is a property in which even if a nanoparticle has ferromagnetism, magnetization orientation tends to be irregular due to ambient thermal energy among different particles, which fails to keep stable magnetization. When the recording layer is formed by the amorphous structure 303, instead of the granular structure 305, this means a size at which magnetic particles cannot be substantially observed, which refers to a state in which constituent elements are not separated, and regarded as uniform.

In the granular structure 302 forming the portion 102 of the recording layer on the convex portion, magnetic particles surrounded by a nonmagnetic material are characterized by having a cylindrical structure of which cylinder height direction is parallel with the direction 304 vertical to the surface of the member 100 having the concave and convex thereon. Furthermore, in the granular structure 305 (not the abovementioned amorphous in this case) forming the portion 103 of the recording layer on the concave portion, the height direction of the cylinder is not uniform, but irregular, as shown in FIGS. 3A and 3C.

While the recording layer with the granular structure suitably used in the present invention has been described, it is to be understood that a recording layer with other structures is applicable to the present invention as long as it is possible to realize a magnetic recording layer consisting of the same component material provided immediately on the concave and convex portions, the magnetic recording layer being different in magnetic properties with each other.

Shapes of the concave portion of the member 100 with the concave and convex thereon according to the present invention are described below.

FIGS. 2A to 2D show schematic diagrams of shapes of the concave and convex according to the present invention.

FIGS. 2A to 2D are schematic diagrams showing the concave portions in the shape of rectangle, triangle, semicircle and trapezoid. These shapes can be realized by shape-forming means for forming the material composing the member with the concave and convex portions thereon. What is important in the present invention is the depth (D) 104 of the concave portion and the width (Wg) 105 on the surface of the concave portion. They need fitting the definition in FIG. 2. More specifically, it is preferable that the depth (D) 104 of the concave portion is 50 nm or less, and the width (Wg) of the concave portion is 100 nm or less. It is further preferable to satisfy a formula Wg<2D. Still furthermore, it is preferable that the width (Wt) 106 of the convex portion is 10 nm or more to 300 nm or less. The lower limits of the foregoing depth D and width Wg are, for example, a few nanometers or more, specifically, 2 nm or more.

For the thickness of the recording layer 101, the portion 102 of the recording layer on the convex portion is preferably 30 nm or less in thickness. However, the portion 103 of the recording layer on the concave portion is preferably 80 nm or less in the total thickness, taking account of the aforementioned depth of the concave portion. In the present invention, the recording layer is formed on the member with the concave and convex portions, however, it is allowable that there exists a concave in the recording layer on the concave portion if it is negligibly small enough to float a magnetic head. It is possible to make the concave shallower enough than the depth (D) 104 of the recording layer on the concave portion or to make the concave flat by a method of forming film and the like. This resolves a problem with degradation caused by processes such as a conventional etching into a recording layer and the like. In the present invention, the recording layer is formed on the concave and convex portions, it is yet preferable to make the surface of the recording layer substantially flat in configuration, consequently it is important to limit the depth of the concave portion within the above range. At this point, a bump formed on the surface of the recording layer (difference in height in an area of 1 μm×1 μm) is, for example, 20 nm or less, more preferably 10 nm or less, further preferably 5 nm or less, thus, it is preferable to make the bump substantially flat.

Figure 4:
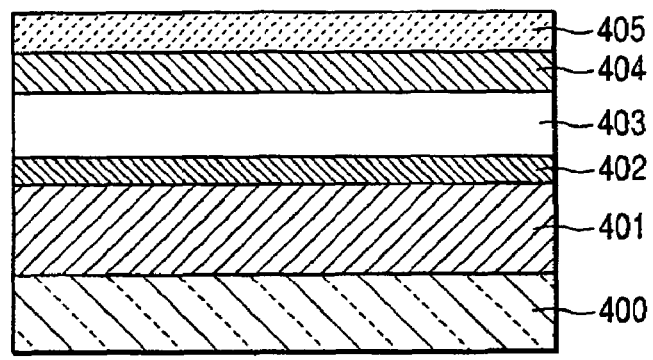
FIG. 4 shows one example of the structure of layers in the magnetic recording medium.

FIG. 4 shows one example of structure of layers for composing the magnetic recording medium.

It is necessary only that the magnetic recording medium according to the present invention be provided with the member 100 with the concave and convex thereon and the recording layer, this does not mean that other structures for layers are excluded. As shown in FIG. 4, as preferable one example, it is preferable that layers are structured at least by a substrate 400, soft magnetic layer 401, underlayer 402, recording layer 403, protective layer 404 and lubricant layer 405 in that order from the lower to the higher layers. FIG. 4 does not illustrate concave and convex, the member 100 having the concave and convex thereon corresponds to the underlayer 402. It is also allowable that the member 100 is caused to correspond to the soft magnetic layer 401 and the surface of the concave and convex portions of the soft magnetic layer 401 is coated with a thin underlayer 402.

It is preferable to choose a magnetic material by which a granular structure can be formed to compose the recording layer. The granular structure refers to arrangement forming a recording layer from a granular medium. "Dictionary of Storage Terminology" (Sutoreji Yogo Jiten, in Japanese) compiled by International Disk Drive Equipment and Materials Association defines a granular medium as: (1) being such that magnetic particles are embedded in a matrix such as oxide and the like. Oxide and others exist between crystal grains. For example, $CoPt$—$SiO_2$, $CoCrPtO$, and others; and (2) in a vertical recording medium, a magneto-optical amorphous magnetic thin film is designated as continuous membrane, while a magnetic thin film consisting of polycrystal grain is designated as granular film. Conventional CoCr-based magnetic thin film.

The inventor therefore contends that the portion 102 of the recording layer on the convex portion according to the present invention is formed by a film fitting this definition, but the portion 103 of the recording layer on the concave portion may be formed by a film not fitting this definition.

Specifically, it is preferable to use

CoCr, CoCrPt, CoCrPtB, CoCrPtTa, CoCrPt—$SiO_2$, CoPt—$SiO_2$, CoCrPtO, CoPt—MgO, CoPt.$Al_2O_3$, FePt—$SiO_2$, FePt—MgO, FePt—$Al_2O_3$, CoB/Pt-based multilayer film, FeB/Pt-based multilayer film, CoB/Pd-based multilayer film, and FeB/Pd-based multilayer film.

Furthermore, it is preferable to choose composition ratios corresponding to film formation methods described below, in the films.

The following is a description of film formation in the recording layer according to the present invention.

First, it is preferable that a material for the recording layer according to the present invention is selected primarily from among the aforementioned materials. However, it is also preferable that Al portion is removed from AlSi-based granular structure, and the structure is filled with magnetic material to form the same structure. The reason is that film structures can be different from each other at the regions corresponding to the concave and convex shown in FIG. 3A and 3B according to the film formation method of the present invention. Until now there have been a few studies in the inner structure of the film in the concave and convex structure and in a positive application of the inner structure, this view has been found in our studies. The AlSi-based granular structure is characterized by consisting of a matrix of an Al cylinder and amorphous Si.

For the film formation method, it is preferable that the film is formed in a non-equilibrium state. It is preferable to use sputtering method, vacuum deposition method, electron beam deposition method, and ion beam sputtering method. It is particularly preferable to use sputtering method and ion beam sputtering method in consideration of inducting ionized particles into a substrate by applying bias in the film formation method because it is important to apply bias to the substrate in the present invention.

With the composition of materials such as magnetic material used for formation of film, it is important to use a material with a higher sputtering yield and to raise the composition ratio of the material, in a composition to be realized at the portion 102 of the recording layer on the convex portion obtained after formation of the film. The sputtering yield means that how many ingredients are ejected by colliding one process gas. That is to say, in the present invention, the application of bias to the substrate causes a constituent element to be desorbed again from the film by collision of ionized particles in the substrate, this requires to supply more elements liable to be desorbed again, that is why measures for the abovementioned material composition is needed. The concave and convex are reduced or flattened in spite that the film is formed on the member 100 with the concave and convex portions thereon, which is one of characteristics of the present invention, this is because effect of this bias is effectively used. The method for applying the bias is not restricted within DC but it is also preferable to use RF(radio frequency) therefor.

The following is a description of arrangement of concave and convex of the member having the concave and convex thereon.

Figure 5A:
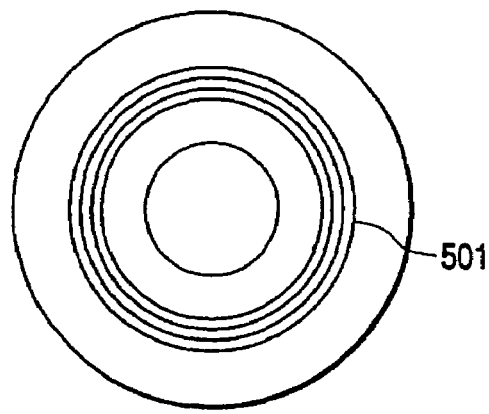
FIGS. 5A and 5B are schematic diagrams showing the concave and convex, or directions of recording tracks.
Figure 5B:
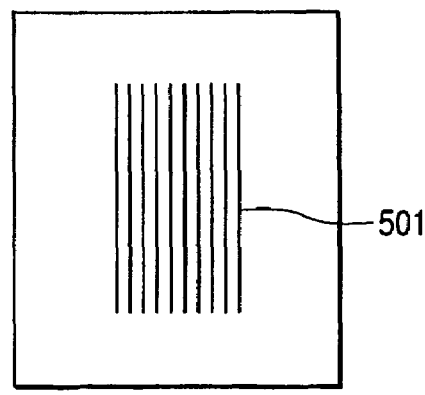

FIGS. 5A and 5B are schematic diagrams showing concave and convex, or directions of recording tracks.

The concave and convex form the recording tracks, so that they show the direction 501 of the recording tracks. As shown in FIG. 5A, it is preferable that the concave and convex are formed concentrically with the center position or spirally if the circular substrate is used. If a recording head is linearly driven, it is also preferable to arrange the concave and convex linearly as shown in FIG. 5B without limiting them to concentrical. Patterns may be formed in advance for performing servo for tracking the recording head. Patterning is also allowable in the direction for adapting the recording tracks. This arrangement of the concave and convex is applicable to so-called patterned medium. Such substrates as glass substrate, silicon substrate, aluminum substrate with NiP, and the like can be used as a substrate as long as their surfaces are flat. The concave and convex are formed on the underlayer and the like as described earlier, therefore it is possible to process those substrates without apprehensions about magnetic degradation.

Embodiment

First Embodiment

The present embodiment relates to difference in structure between the recording layers on the convex and concave portions of the magnetic recording medium according to the present invention.

Figure 2A:
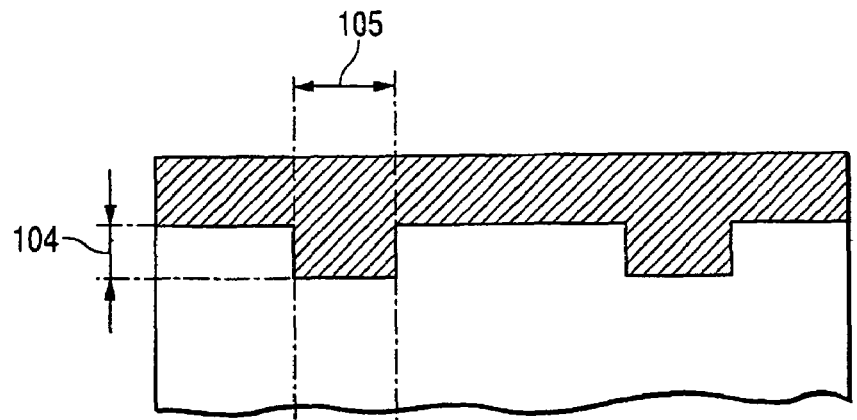
FIGS. 2A, 2B, 2C and 2D show schematic diagrams of shapes of the concave and convex according to the present invention.
Figure 2B:
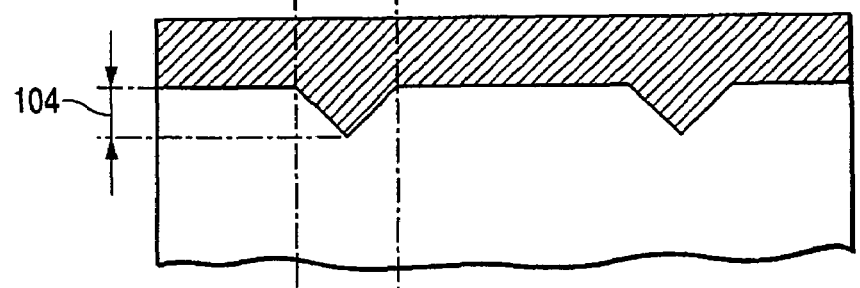
Figure 2C:
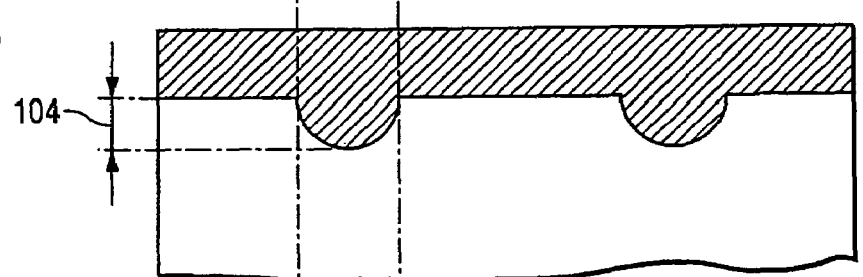
Figure 2D:
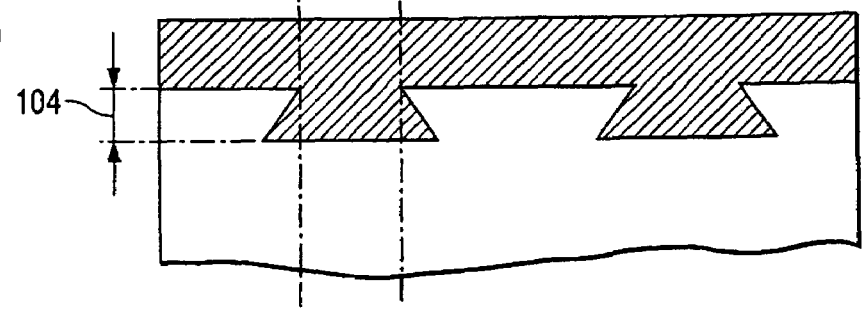

A 30 nm thick Cr ground layer is formed on a 2.5 inch glass substrate, coated with resist, and subjected to a concentric electron beam exposure. A rectangular concave is formed on the Cr underlayer by development and dry etching as shown in FIG. 2A. At this point, the width (Wt) of the convex portion is set to 120 nm, the width (Wg) of the concave portion is set to 30 nm, and the depth (D) of the concave portion is set to 20 nm. In the next place, the entire resist is removed to expose the entire surface of the Cr underlayer with the concave portion. This substrate is introduced into a sputtering device to apply a DC bias of −40 volts across a substrate through the Cr underlayer. A 20 nm thick film is formed on the convex portion by sputtering CoCrPt as ingredient. After the film has been formed, the structure is observed from top and cross section with a transmission electron microscope. The structure appears as shown in FIGS. 3A and 3C. It has been observed that the size of the magnetic particle at the portion of the recording layer on the convex portion is about 15 nm, on the other hand, that of the magnetic particle at the portion of the recording layer portion on the concave portion is about 7 nm. Furthermore, it is observed from the direction of cross section that cylindrical magnetic particles are vertically arranged in the recording layer on the convex portion, but the magnetic particles in the recording layer on the concave portion are tilted relative to the vertical direction.

Thus, difference can be confirmed in particle diameter and directivity of the magnetic particles between the recording layers on the convex and concave portions.

While the glass substrate is used in the above embodiment, other members for example a flat plate can be used.

Second Embodiment

The present embodiment relates to difference in structure between the recording layers on the convex and concave portions of the magnetic recording medium according to the present invention.

The same substrate is prepared as in the first embodiment. The substrate is introduced into a sputtering device to apply a DC bias of −40 volts across a substrate through the Cr underlayer. CoCrPt.SiO$_2$ as ingredient is sputtered to form a film. After the film has been formed, the structure is observed from top and cross section with a transmission electron microscope. The structure appears as shown in FIGS. 3B and 3D. The size of the magnetic particle at the portion of the recording layer on the convex portion is about 7 nm, on the other hand, the magnetic particles at the portion of the recording layer on the concave portion cannot be observed and are of amorphous structure. Furthermore, it is observed from the direction of cross section that the cylindrical magnetic particles are vertically arranged in the recording layer on the convex portion, while the magnetic particles in the recording layer on the concave portion are of amorphous structure.

Thus, it can be observed that magnetic particles are formed in the recording layer on the convex portion and the amorphous structure is formed in the recording layer on the concave portion.

Third Embodiment

The present embodiment relates to difference in magnetic properties between the recording layers on the convex and concave portions of the magnetic recording medium according to the present invention.

The composition and structure of CoCrPt—SiO$_2$ on the convex portion in the second embodiment are analyzed. The film substantially the same as the above is prepared to cover the Cr underlayer on the glass substrate. In this case, concave and convex are not formed on the Cr underlayer. Furthermore, even when the composition and structure of CoCrPt—SiO$_2$ on the concave portion in the second embodiment are analyzed, the similar film is prepared. These films are cut into a 3-mm square to measure some hysteresis curves. Squareness as a ratio of remanence to saturated magnetization and coercivity are estimated for each of the films. The film corresponding to the convex portion is 0.9 in Squareness, and 3.6 kOe in coercivity, of which magnetic properties are sufficient to form a recording track. For the film corresponding to the concave portion, since it has the amorphous structure similarly as shown in the second embodiment, saturated magnetization itself is very small, the film is 0.03 in Squareness and about 80 Oe in coercivity.

From the above analysis, it can be shown, if not directly, that the films forming the recording layers on the convex and concave portions are different in magnetic properties from each other.

For a relative comparison, a medium in which FeTaC as soft magnetic layer is inserted between the glass substrate and Cr ground layer is prepared for the magnetic recording medium fabricated in the second embodiment. Recording is performed with a recording head to observe the recording patterns with a magnetic force microscope. As a result, clear magnetic recording patterns can be observed at the locations corresponding to the convex portion, but at the locations corresponding to the concave portion, weak magnetic force can barely be detected, but patterns are not observed, from which it can be confirmed that both are relatively different in magnetic properties.

Fourth Embodiment

The present embodiment relates to a substantial flatness on the magnetic recording medium of the present invention after the formation of the recording layer.

The same glass substrate consisting of the Cr underlayer with the concave and convex as in the first embodiment is prepared. The glass substrate is filmed with CoCrPt—$SiO_2$ without applying DC bias to the substrate so that the convex portion can be 20 nm in film thickness. Then a clear dent is observed on the recording layer on the concave portion. However, when a DC bias of −20 volts and −40 volts are applied across the substrate with the same conditions, it is observed that the dent is gradually decreased and it is substantially flat in applying −40 volts. In this case, a time required for forming the a 20-nm thick recording layer on the convex portion needs increasing according as the applying amount of DC bias is increased.

As described above, the application of DC bias to the substrate can substantially flatten the recording layer. The method for applying the bias is not restricted within DC but it is also preferable to use RF(radio frequency) therefor.

Fifth Embodiment

The present embodiment relates to a different method of producing the magnetic recording medium according to the present invention.

The same glass substrate having the Cr underlayer with the concave and convex as in the first embodiment is prepared. AlSi is sputtered on the substrate with a DC bias of −40 volts applied across the substrate. As shown in FIGS. 3B and 3D, Al particles are unclearly formed on the position corresponding to the concave portion, instead amorphous AlSi mixture are formed. It can be observed that Al cylinders are firmly formed on the positions corresponding to the convex portion. It can also be observed that the periphery of the Al cylinders is formed by amorphous Si.

In the next place, the medium is chemically etched in ammonia water, i.e., only Al portion is quickly etched to form pores. The pores are filled with Co by an electrode position process. This makes it clear that only a portion corresponding to the convex portion is filled with Co as magnetic material, and that Co as magnetic material is not deposited to the portion corresponding to the concave portion.

Consequently, it is clear that magnetic recording can be performed only on the portion corresponding to the convex portion.

The above description exemplifies that the magnetic recording medium of the present invention can be formed even when the film of a non-magnetic material is used.

Sixth Embodiment

The present embodiment relates to a magnetic recording reproduction device using the magnetic recording medium according to the present invention.

Figure 6:
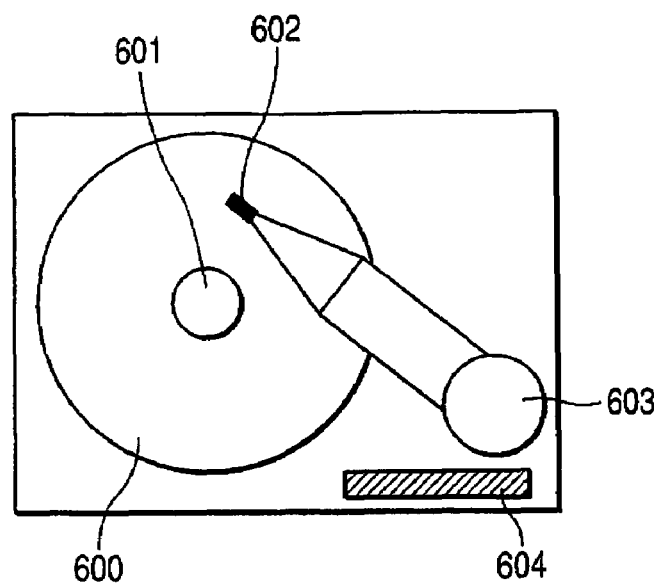
FIG. 6 shows a schematic diagram of a magnetic recording reproduction device using the magnetic recording media according to the present invention.

FIG. 6 shows a schematic diagram of the magnetic recording reproduction device using the magnetic recording media according to the present invention.

As shown in FIG. 6, a magnetic recording reproduction device can be assembled from a magnetic recording medium 600 of the present invention, magnetic recording medium driving unit 601, magnetic head 602, magnetic head driving unit 603, and signal processing unit 604. Furthermore, according to the present embodiment, neither the magnetic recording medium 600 is limited to a rotational drive, nor the magnetic head 602 is limited to a sliding drive on a circle.

Seventh Embodiment

The present embodiment relates to an information processing device for use with a magnetic recording reproduction device according to the present invention.

Figure 7:
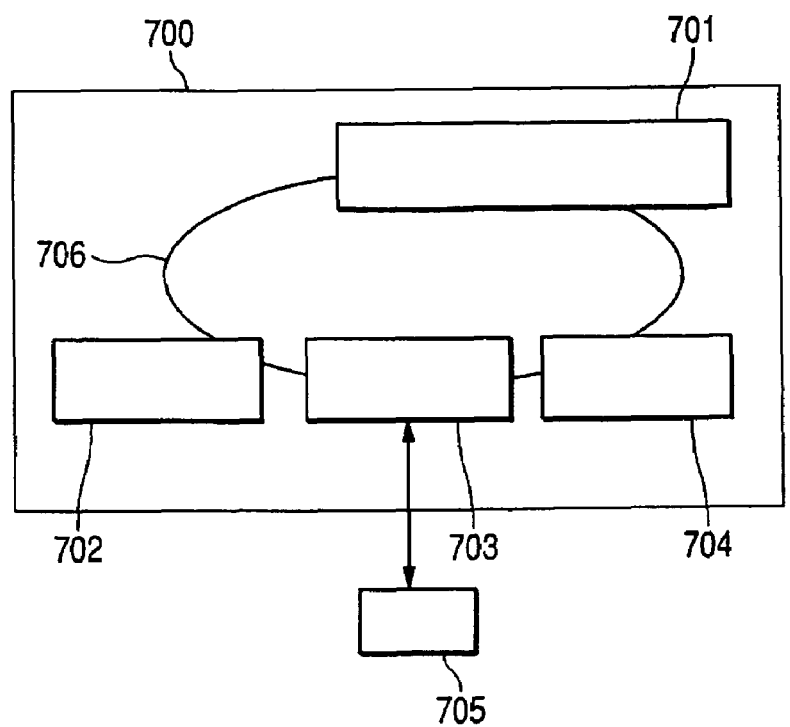
FIG. 7 shows an information processing device using the magnetic recording reproduction device according to the present invention.

FIG. 7 shows an information processing device using the magnetic recording reproduction device according to the present invention.

The magnetic recording reproduction device section 701 described in the sixth embodiment is capable of inputting and outputting information, so that the information processing device with a storing container 700 housing the magnetic recording reproduction device, memory unit 703, arithmetic unit 702, external input/output unit 705, power supply 704, and wiring 706 for connecting these units can be formed, as shown in FIG. 7. The wiring 706 serves its role if it can communicate information irrespective of wiring or radio.

This application claims priority from Japanese Patent Application No. 2005-108666 filed Apr. 5, 2005, which is hereby incorporated by reference herein.

What is claimed is:

1. A magnetic recording medium having a recording layer on a member with a concave-convex portion, wherein the recording layer has cylindrical magnetic particles, the recording layer is provided on the concave and convex portions, and the recording layers on the concave and convex portions are different in magnetic properties from each other.

2. The magnetic recording medium according to claim 1, wherein, for the magnetic properties of the recording layer on the convex and concave portions, the recording layer on the convex portion is higher in remanence and coercivity than the recording layer on the concave portion.

3. The magnetic recording medium according to claim 1, wherein a granular structure is formed on the recording layer at least on the convex portion.

4. The magnetic recording medium according to claim 1, wherein the magnetic recording medium satisfies at least one of the following:
   the cylindrical magnetic particle in the granular structure in the recording layer on the concave portion is smaller in average diameter than the cylindrical magnetic particle in the granular structure in the recording layer on the convex portion, and
   the cylindrical magnetic particle in the recording layer on the convex portion is parallel with the direction vertical to a substrate, while at least a part of the cylindrical magnetic particles in the recording layer on the concave portion deviates from parallel.

5. The magnetic recording medium according to claim 1, wherein the recording layer on the concave portion is comprised of an amorphous structure in which the existence of particles are substantially not recognized.

6. The magnetic recording medium according to claim 1, wherein the recording layer on the member is substantially flat.

7. The magnetic recording medium according to claim 1, wherein the concave portion is 50 nm or less in depth D and 100 nm or less in width Wg at the surface of a material of the concave portion.

8. The magnetic recording medium according to claim 7, wherein the width Wg is less than the double of the depth D.

9. The magnetic recording medium according to claim 1, wherein the convex portion is 10 nm or more to 300 nm or less in width Wt.

10. The magnetic recording medium according to claim 9, wherein the recording layer on the convex portion is 30 nm or less in thickness.

11. A method of manufacturing the magnetic recording medium according to claim 1 comprising the steps of:
introducing the member with the concave and convex portions into a sputtering device,
subjecting the member as a substrate to the application of a DC bias voltage, whereby a magnetic material is sputtered to form a granular structure with cylindrical magnetic particles at least on the convex portion.

12. A method of manufacturing the magnetic recording medium according to claim 1 comprising the steps of:
introducing the member with the concave and convex portions into a sputtering device,
subjecting the member as a substrate to the application of a DC bias voltage, whereby AlSi is sputtered to form a granular structure with cylindrical Al particles at least on the convex portion, and then
removing Al portions to fill a magnetic material.

13. A magnetic recording reproduction device comprising the magnetic recording medium of claim 1, a magnetic recording medium driving unit, a magnetic head, a magnetic head driving unit and a signal processing unit.

14. An information processing device comprising the magnetic recording reproduction device of claim 13, a storage container housing the magnetic recording reproduction device; a memory unit, an arithmetic unit, an external input/output unit, a power supply and wiring connecting the magnetic recording reproduction device, the memory unit, the arithmetic unit and the power supply.

* * * * *